(12) United States Patent
Zhang (10) Patent No.: US 12,150,166 B2
(45) Date of Patent: Nov. 19, 2024

(54) INFORMATION TRANSMISSION METHOD, RELATED DEVICE, AND STORAGE MEDIUM

(71) Applicant: GUANGDONG OPPO MOBILE TELECOMMUNICATIONS CORP., LTD., Dongguan (CN)

(72) Inventor: Zhi Zhang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 346 days.

(21) Appl. No.: 17/735,092

(22) Filed: May 2, 2022

(65) Prior Publication Data
US 2022/0272747 A1    Aug. 25, 2022

Related U.S. Application Data

(63) Continuation of application No. PCT/CN2019/116827, filed on Nov. 8, 2019.

(51) Int. Cl.
*H04W 74/00* (2009.01)

(52) U.S. Cl.
CPC ................. *H04W 74/002* (2013.01)

(58) Field of Classification Search
None
See application file for complete search history.

(56) References Cited

U.S. PATENT DOCUMENTS

| 10,200,992 B2 | 2/2019 | Dinan | |
|---|---|---|---|
| 2015/0009870 A1* | 1/2015 | Bashar | H04L 5/0016 370/280 |
| 2015/0341975 A1* | 11/2015 | Wang | H04L 1/00 370/329 |
| 2018/0115992 A1 | 4/2018 | Park et al. | |
| 2019/0150170 A1 | 5/2019 | Park et al. | |
| 2019/0268902 A1* | 8/2019 | Sun | H04L 5/0053 |
| 2021/0105815 A1* | 4/2021 | Salem | H04W 16/14 |

FOREIGN PATENT DOCUMENTS

| CN | 105846921 A | 8/2016 |
|---|---|---|
| CN | 105978671 A | 9/2016 |
| CN | 106559795 A | 4/2017 |
| CN | 107949067 A | 4/2018 |

(Continued)

OTHER PUBLICATIONS

International Search Report issued in corresponding International Application No. PCT/CN2019/116827, mailed Jul. 29, 2020, 33 pages.

(Continued)

*Primary Examiner* — Xavier S Wong
(74) *Attorney, Agent, or Firm* — BAYES PLLC (57) ABSTRACT

Disclosed in embodiments of the present application are a data transmission method, a related device, and a storage medium. The method comprises: a terminal receives first information sent by a base station, the first information being used by the terminal to determine a channel access type for channel detection on an unlicensed spectrum and a start position of at least one of an extended cyclic prefix (ECP) transmission and an uplink transmission after channel detection on the unlicensed spectrum.

16 Claims, 5 Drawing Sheets

(56) References Cited

FOREIGN PATENT DOCUMENTS

| | | |
|---|---|---|
| CN | 109479321 A | 3/2019 |
| WO | 2017131476 A1 | 8/2017 |
| WO | 2018173005 A1 | 9/2018 |

OTHER PUBLICATIONS

Written Opinion of the International Searching Authority issued in corresponding International Application No. PCT/CN2019/116827, mailed Jul. 29, 2020, 9 pages.
Priority Review issued in corresponding Chinese application No. 202210821732.1, mailed Jun. 30, 2023.
First Office Action issued in corresponding Chinese application No. 202210821732.1, mailed Jul. 26, 2023.
Notice of Allowance issued in corresponding European application No. 19951627.9, mailed Aug. 18, 2023.
Vivo, "Discussion on the channel access procedures", 3GPP TSG RAN WG1#98bis R1-1910204 Chongqing, China, Oct. 14-20, 2019.
Nokia et al., "Feature Lead's Summary #3 on Channel Access Procedures", 3GPP TSG RAN WG1 Meeting #98 R1-1909810 Prague, Czech Republic, Aug. 26-30, 2019.
Extended European Search Report issued in corresponding European application No. 19951627.9, mailed Oct. 12, 2022.
Nokia et al., "Feature Lead's Summary #2 on Channel Access Procedures", R1-1911706, 3GPP TSG RAN WG1 Meeting #98bis Chongqing, P.R. China, Oct. 14-20, 2019.

\* cited by examiner

INFORMATION TRANSMISSION METHOD, RELATED DEVICE, AND STORAGE MEDIUM

CROSS-REFERENCE TO RELATED APPLICATION

This application is a continuation of International Application No. PCT/CN2019/116827, filed Nov. 8, 2019, the entire contents of which are incorporated herein by reference.

TECHNICAL FIELD

The present application relates to wireless communication technology, in particular, to an information transmission method, related device and storage medium.

BACKGROUND

In order to make various communication systems using unlicensed spectrum for wireless communication coexist friendly on the unlicensed spectrum, some countries or regions have stipulated the regulatory requirements that must be met when using the unlicensed spectrum.

For example, the communication device follows the principle of "listen before talk (LBT)", that is, before transmitting the signal on the channel of the unlicensed spectrum, the communication device needs to listen to the channel. The communication device can transmit the signal only when the channel listening result is that the channel is idle; and if the channel listening result of the communication device on the channel of the unlicensed spectrum is that the channel is busy, the communication device cannot transmit signals.

The related art does not involve the technical scheme of how the terminal carries out channel detection on the unlicensed spectrum and how to carry out uplink transmission.

SUMMARY

The embodiments of the present application provide an information transmission method, related device and storage medium.

The embodiments of the present application provide an information transmission method applied to a terminal, including:
receiving, by a terminal, first information sent by a base station. The first information is used for the terminal to determine a channel access type for channel detection on an unlicensed spectrum, and a starting position of at least one of Extended Cyclic Prefix (ECP) transmission or uplink transmission after the channel detection on the unlicensed spectrum.

The embodiments of the present application provide an information transmission method applied to a base station, including:
sending, by a base station, first information to the terminal. The first information is used for the terminal to determine a channel access type for channel detection on an unlicensed spectrum, and a starting position of at least one of ECP transmission or uplink transmission after the channel detection on the unlicensed spectrum.

The embodiments of the present application provide a terminal, including:
a receiving unit, configured to receive first information sent by a base station. The first information is used for the terminal to determine a channel access type for channel detection on an unlicensed spectrum, and a starting position of at least one of ECP transmission or uplink transmission after the channel detection on the unlicensed spectrum.

The embodiments of the present application provide a base station, including:
a sending unit, configured to send first information to a terminal. The first information is used for the terminal to determine a channel access type for channel detection on an unlicensed spectrum, and a starting position of at least one of ECP transmission or uplink transmission after the channel detection on the unlicensed spectrum.

According to the information transmission method, related device and storage medium provided by the embodiments of the present application, the terminal receives the first information sent by the base station; the first information is used for the terminal to determine the channel access type for channel detection on the unlicensed spectrum and the starting position of at least one of ECP transmission or uplink transmission after channel detection on the unlicensed spectrum. In this way, the terminal can determine the channel access type for channel detection on the unlicensed spectrum and the starting position of at least one of ECP transmission or uplink transmission after channel detection on the unlicensed spectrum based on the first information, so that the terminal can realize channel detection on the unlicensed spectrum and start ECP transmission and/or uplink transmission after channel detection according to the determined channel access type.

DETAILED DESCRIPTION

The present application is described in further detail below in combination with the accompanying drawings and specific embodiments.

Figure 1:
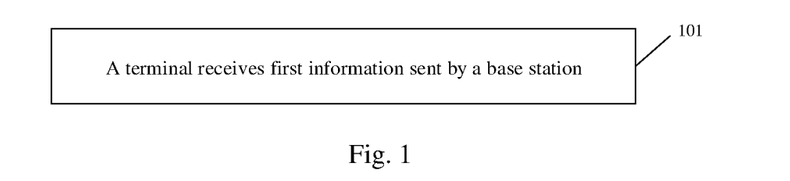
FIG. 1 is a schematic diagram of an implementation flow of an information transmission method on a terminal side according to the embodiment of the present application.

The embodiments of the present application provide an information transmission method applied to a terminal. FIG. 1 is a flow diagram of the information transmission method according to the embodiment of the application. As shown in FIG. 1, the method includes the following steps.

In step 101, the terminal receives first information sent by a base station. The first information is used for the terminal to determine a channel access type for channel detection on an unlicensed spectrum, and a starting position of at least one of ECP transmission or uplink transmission after the channel detection on the unlicensed spectrum.

The specific type of the terminal may not be limited in the present application, for example, it may be a smartphone, a personal computer, a notebook computer, a tablet computer, a portable wearable device, etc.

The concepts of the unlicensed spectrum and the channel access type are described below.

The unlicensed spectrum refers to a shared spectrum. In other words, communication devices in different communication systems can use this spectrum as long as they meet the regulatory requirements set by countries or regions on this spectrum, without applying to the government for exclusive spectrum authorization.

In order to enable various communication systems using the unlicensed spectrum for wireless communication to coexist friendly on this spectrum, some countries or regions have stipulated the regulatory requirements that must be met when using the unlicensed spectrum.

For example, the communication device follows the LBT principle, that is, the communication device needs to listen to the channel before sending the signal on the channel of the unlicensed spectrum. The communication device can transmit the signal only when the channel listening result is that the channel is idle; and if the channel listening result of the communication device on the channel of the unlicensed spectrum is that the channel is busy, the communication device cannot send signals. In order to ensure fairness, in one transmission, the duration of signal transmission by the communication device using the channel of the unlicensed spectrum shall not exceed the Maximum Channel Occupancy Time (MCOT).

Alternatively, in the embodiments of the present application, the communication device may have the following three channel access types when performing LBT, where the bandwidth of LBT may be 20 MHz or an integral multiple of 20 MHz.

LBT Category1 (Cat1): the communication device does not need to perform channel detection on the unlicensed spectrum, and performs transmission immediately after the switching gap is completed, where the switching gap does not exceed 16 μs.

LBT Category2 (Cat2): the communication device performs channel detection on the unlicensed spectrum; if the channel is idle in a single detection time, signal transmission can be carried out, and if the channel is occupied, signal transmission cannot be carried out; the single detection time is 16 us or 25 us.

LBT Category3 (Cat4): the communication device performs channel detection on the unlicensed spectrum; the duration of channel detection needs to be further determined according to a priority of transmission service.

In practical application, the base station schedules the terminal for uplink transmission in the unlicensed spectrum. In order to realize uplink transmission, for Cat1 or Cat2, the terminal needs to determine the starting position of channel detection on the unlicensed spectrum and the starting position of at least one of ECP transmission or uplink transmission after channel detection on the unlicensed spectrum according to the first information sent by the base station; and for Cat4, the terminal needs to determine the starting position of channel detection on the unlicensed spectrum and the starting position of uplink transmission after channel detection on the unlicensed spectrum according to the first information sent by the base station.

The process of how the terminal determines the starting position of channel detection on the unlicensed spectrum when the channel access type is Cat1 or when the channel access type is Cat2 is described below.

In an embodiment, the first information is also used to indicate a starting time corresponding to an uplink time domain resource of the terminal scheduled by the base station, a first duration for the terminal to perform channel detection on the unlicensed spectrum, and a length of ECP transmitted by the terminal after the channel detection on the unlicensed spectrum. The method further includes the following steps.

The terminal determines the channel access type for channel detection on the unlicensed spectrum according to the first information; when it is determined that the channel access type is Cat1 or when it is determined that the channel access type is Cat2, the terminal determines the starting position of channel detection on the unlicensed spectrum according to the starting time, the first duration and the length of ECP indicated by the first information.

The channel access type may be explicitly indicated by the first information, that is, the first information may carry the channel access type. The channel access type may also be bound and indicated by other parameter in the first information, that is, the channel access type may be bound and indicated by one of the starting time, the first duration and the length of ECP indicated by the first information.

For example, the first duration is bound to the channel access type. If the first duration is 25 us, the channel access type bound to the first duration is Cat2.

Here, when the channel access type is Cat1 or when the channel access type is Cat2, the terminal may determine the starting position of channel detection on the unlicensed spectrum according to formula (1).

$$T2 = T0 - TA - E - D \qquad (1),$$

where T2 represents the starting position of the terminal for channel detection on the unlicensed spectrum, T0 represents the starting time corresponding to the uplink time domain resource of the terminal scheduled by the base station, TA represents a time advance of uplink synchronization between the terminal and the base station, E represents the length of ECP transmitted by the terminal after channel detection on the unlicensed spectrum, and D represents the first duration during which the terminal performs channel detection on the unlicensed spectrum.

In an example, taking the channel access type as Cat1 or taking the channel access type as Cat2 as an example, the process of the terminal determining the starting position T2 for channel detection on the unlicensed spectrum is described.

Figure 2:
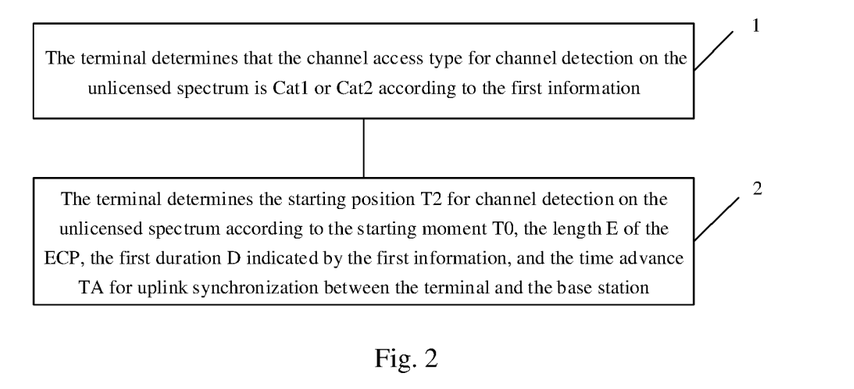
FIG. 2 is a first schematic diagram of an implementation flow of determining a starting position T2 for Cat1 or Cat2 by the terminal according to the embodiment of the present application.

As shown in FIG. 2, the process of the terminal determining the starting position T2 includes the following steps.

In step 1, according to the first information, the terminal determines that the channel access type for channel detection on the unlicensed spectrum is Cat1 or the terminal determines that the channel access type for channel detection on the unlicensed spectrum is Cat2.

In step 2, the terminal determines the starting position T2 for channel detection on the unlicensed spectrum according to the starting time T0, the length E of the ECP, and the first duration D indicated by the first information, and the time advance TA for uplink synchronization between the terminal and the base station.

When the terminal is in a connected state, the time advance TA may be obtained.

Figure 3A:
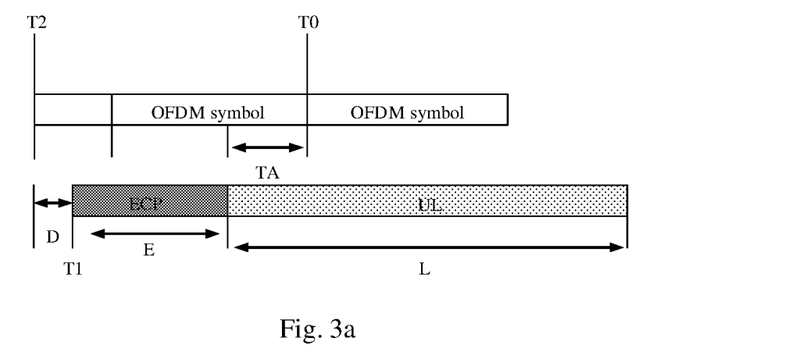
FIG. 3a and FIG. 3b are schematic diagrams of determining the starting position T2 by the terminal according to the embodiment of the present application.
Figure 3B:
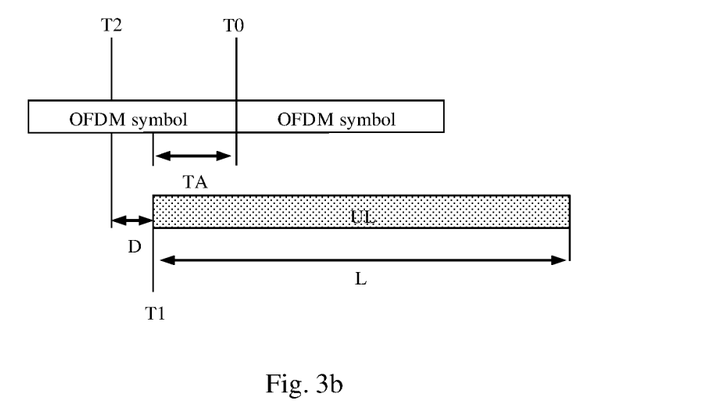

The terminal may determine the starting position of channel detection on the unlicensed spectrum according to formula (1). As shown in FIG. 3a, the length E of ECP is not equal to zero; and as shown in FIG. 3b, the length E of the ECP is equal to zero.

In an embodiment, the first information is also used to indicate the first duration for the terminal to perform channel detection on the unlicensed spectrum, and the method further includes:

the terminal determining the channel access type for channel detection on the unlicensed spectrum according to the first information; and determining the starting position of ECP transmission after channel detection on the unlicensed spectrum; when determining that the channel access type is Cat1 or determining that the channel access type is Cat2, the terminal determining the starting position of channel detection on the unlicensed spectrum according to the determined starting position of ECP transmission and the first duration.

The channel access type may be explicitly indicated by the first information, that is, the first information may carry the channel access type. The channel access type may also be bound and indicated by other parameter in the first information, that is, the channel access type may be bound and indicated by the first duration indicated by the first information.

For example, the first duration is bound to the channel access type. If the first duration is 25 us, the channel access type bound to the first duration is Cat1. The starting position of the ECP transmission may be explicitly indicated by the first information, that is, the first information may carry the starting position of the ECP transmission. The starting position of the ECP transmission may also be bound and indicated by other parameter in the first information, that is, the channel access type may be bound and indicated by the first duration indicated by the first information.

Here, when the channel access type is Cat1 or when the channel access type is Cat2, the terminal may determine the starting position of channel detection on the unlicensed spectrum according to formula (2).

$$T2=T1-D \qquad (2),$$

where T2 represents the starting position of the terminal for channel detection on the unlicensed spectrum, T1 represents the starting position of the terminal for ECP transmission after channel detection on the unlicensed spectrum, and D represents the first duration of the terminal for channel detection on the unlicensed spectrum.

In an example, taking the channel access type as Cat1 or taking the channel access type as Cat2 as an example, the process of the terminal determining the starting position T2 for channel detection on the unlicensed spectrum is described.

Figure 4:
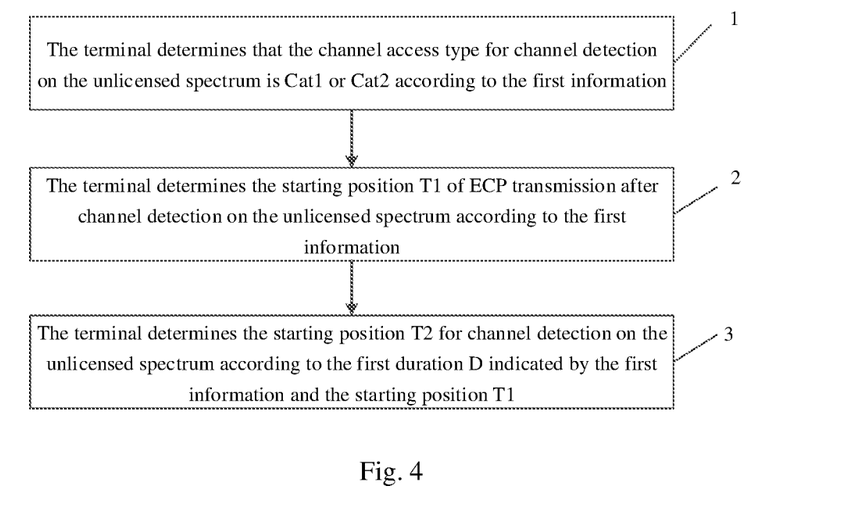
FIG. 4 is a second schematic diagram of an implementation flow of determining the starting position T2 for Cat1 or Cat2 by the terminal according to the embodiment of the present application.

As shown in FIG. 4, the process of the terminal determining the starting position T2 includes the following steps.

In step 1, according to the first information, the terminal determines that the channel access type for channel detection on the unlicensed spectrum is Cat1 or the terminal determines that the channel access type for channel detection on the unlicensed spectrum is Cat2.

In step 2, the terminal determines the starting position T1 of ECP transmission after channel detection on the unlicensed spectrum according to the first information.

In step 3, the terminal determines the starting position T2 for channel detection on the unlicensed spectrum according to the first duration D indicated by the first information and the starting position T1.

The terminal may determine the starting position of channel detection on the unlicensed spectrum according to formula (2). As shown in FIG. 3a, the length E of ECP is not equal to zero; and as shown in FIG. 3b, the length E of ECP is equal to zero.

In an embodiment, the first information is also used to indicate the starting position of the terminal for channel detection on the unlicensed spectrum; and the method further includes:

the terminal determining the channel access type for channel detection on the unlicensed spectrum according to the first information; and when it is determined that the channel access type is Cat1 or when it is determined that the channel access type is Cat2, the terminal determining the starting position of channel detection on the unlicensed spectrum according to the first information.

The channel access type may be explicitly indicated by the first information, that is, the first information may carry the channel access type. The channel access type may also be bound and indicated by other parameter in the first information, that is, the channel access type may be bound and indicated by the starting position of channel detection indicated by the first information.

Here, the starting position for channel detection may be explicitly indicated by the first information, in other words, the first information carries the starting position for channel detection.

In an embodiment, the first information is also used to indicate a starting time corresponding to the uplink time domain resource of the terminal scheduled by the base station and a second duration. The second duration represents a time interval between the starting time and a start time when the terminal performs channel detection operation. The method further includes:

the terminal determining the channel access type for channel detection on the unlicensed spectrum according to the first information; when determining that the channel access type is Cat1 or when determining that the channel access type is Cat2, the terminal determining the starting position of channel detection on the unlicensed spectrum according to the starting time and the second duration indicated by the first information.

The channel access type may be explicitly indicated by the first information, that is, the first information may carry the channel access type. The channel access type may also be bound and indicated by other parameter in the first information, that is, the channel access type may be bound and indicated by one of the starting time and the second duration indicated by the first information.

For example, the starting time is bound with the channel access type. If the starting time is 40 us, the channel access type bound with the starting time is Cat1.

Here, when the channel access type is Cat1 or when the channel access type is Cat2, the terminal may determine the starting position of channel detection on the unlicensed spectrum according to formula (3).

$$T2=T0-T=T0-(m \times Ls+O1) \quad (3),$$

where T2 represents the starting position of the terminal for channel detection on the unlicensed spectrum, T0 represents the starting time corresponding to the uplink time domain resource of the terminal scheduled by the base station, T represents the second duration, m is an integer, Ls represents a length of OFDM symbol, and O1 represents an offset between a boundary of the first OFDM symbol and the starting position of the terminal for channel detection. The first OFDM symbol may be N OFDM symbols before the starting time T0 corresponding to the uplink time domain resource, and N is an integer.

In an embodiment, the value of m is determined by one of the following ways:

the terminal determining the value of m according to the first information; the first information including the value of m;

the terminal comparing a time advance (TA) with a preset threshold to obtain a comparison result; determining the value of m according to the comparison result; the preset threshold being determined by the terminal according to a subcarrier spacing (SC S) and the first duration D for channel detection.

The value of m may be explicitly indicated by the first information, that is, the first information carries the value of m. TA represents the time advance of uplink synchronization between the terminal and the base station.

As shown in Table 1, the first information may display the indication thresholds 1 to 6 and the first duration D for channel detection. First, the terminal selects the currently used threshold from the thresholds 1 to 6 indicated by the first information according to the corresponding relationship among the subcarrier spacing SCS, the first duration D and the threshold Th shown in Table 1, assuming that threshold 2 is selected; then, the terminal compares TA with threshold 2 to obtain the comparison result, and determines the value of m according to the comparison result. For example, if TA is less than threshold 2, m=m1; otherwise, m=m2.

TABLE 1

| m1 | m2 | Subcarrier spacing SCS | First duration D | Threshold Th |
|---|---|---|---|---|
| 2 | 3 | 60 khz | 25 us | Configurable threshold 1 |
| 1 | 2 | 60 khz | 16 us | Configurable threshold 2 |
| 1 | 2 | 30 khz | 25 us | Configurable threshold 3 |
| 1 | 2 | 30 khz | 16 us | Configurable threshold 4 |
| 1 | 2 | 15 khz | 25 us | Configurable threshold 5 |
| 1 | 2 | 15 khz | 16 us | Configurable threshold 6 |

Next, the process of how the terminal determines the value of m is illustrated by an example.

Assuming that SCS is 15 kHz and D=16 us, the threshold determined by the terminal according to the corresponding relationship among subcarrier spacing SCS, first duration D and threshold Th shown in Table 1 is threshold 6; then the terminal compares TA with threshold 6. If TA is greater than threshold 6, m is equal to 2; otherwise, m is equal to 1.

Assuming that SCS is 15 KHz and D=25 us, the threshold determined by the terminal according to the corresponding relationship among subcarrier spacing SCS, first duration D and threshold Th shown in Table 1 is threshold 5; then the terminal compares TA with threshold 5. If TA is greater than threshold 5, m is equal to 2; otherwise, m is equal to 1.

Assuming that SCS is 30 kHz and D=16 us, the threshold determined by the terminal according to the corresponding relationship among the subcarrier spacing SCS, the first duration D and the threshold Th shown in Table 1 is threshold 4; the terminal compares TA with threshold 4; if TA is greater than threshold 4, m is equal to 2; otherwise, m is equal to 1.

Assuming that SCS is 30 kHz and D=25 us, the threshold determined by the terminal according to the corresponding relationship among the subcarrier spacing SCS, the first duration D and the threshold Th shown in Table 1 is threshold 3; the terminal compares TA with threshold 3; if TA is greater than threshold 3, m is equal to 2; otherwise, m is equal to 1.

Assuming that SCS is 60 KHZ and D=16 us, the threshold determined by the terminal according to the corresponding relationship among the subcarrier spacing SCS, the first duration D and the threshold Th shown in Table 1 is threshold 2; the terminal compares TA with threshold 2; if TA is greater than threshold 2, m is equal to 2; otherwise, m is equal to 1.

Assuming that SCS is 60 KHZ and D=25 us, the threshold determined by the terminal according to the corresponding relationship among the subcarrier spacing SCS, the first duration D and the threshold Th shown in Table 1 is threshold 1; the terminal compares TA with threshold 1; if TA is greater than threshold 1, m is equal to 3; otherwise, m is equal to 2.

Here, it should be noted that when the base station is not configured with the threshold Th, the terminal may set a threshold by default, compare TA with the default threshold, and determine the value of m according to the comparison result. Alternatively, the terminal does not need to compare the TA with the threshold, but determines a fixed value of m according to the value of SCS, for example, assuming that SCS is 15 KHz or 30 kHz, m is constantly equal to 1; assuming that SCS is 60 kHz, m is constantly equal to 2.

In an example, taking the channel access type as Cat1 or taking the channel access type as Cat2 as an example, the process of the terminal determining the starting position T2 for channel detection on the unlicensed spectrum is described.

Figure 5:
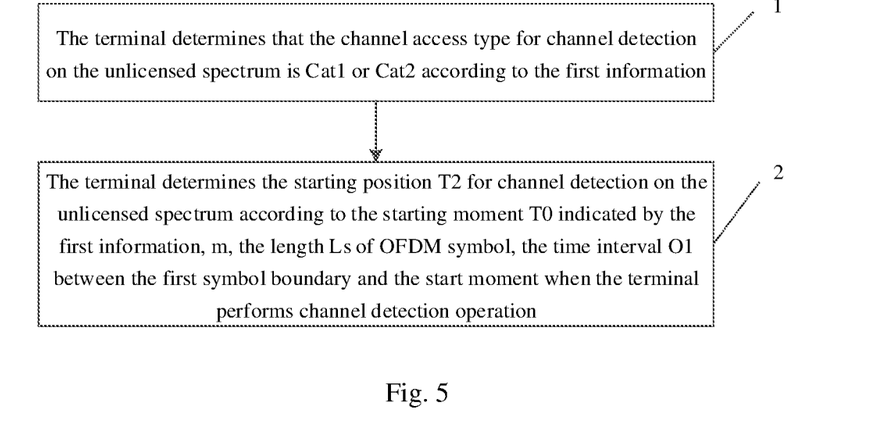
FIG. 5 is a third schematic diagram of an implementation flow of determining the starting position T2 for Cat1 or Cat2 by the terminal according to the embodiment of the present application.

As shown in FIG. 5, the process of the terminal determining the starting position T2 includes the following steps.

In step 1, according to the first information, the terminal determines that the channel access type for channel detection on the unlicensed spectrum is Cat1 or the terminal determines that the channel access type for channel detection on the unlicensed spectrum is Cat2.

In step 2, the terminal determines the starting position T2 for channel detection on the unlicensed spectrum according to the starting time T0 indicated by the first information, m, the length Ls of OFDM symbol, the time interval O1 between the first symbol boundary and the start time when the terminal performs channel detection operation.

Figure 6A:
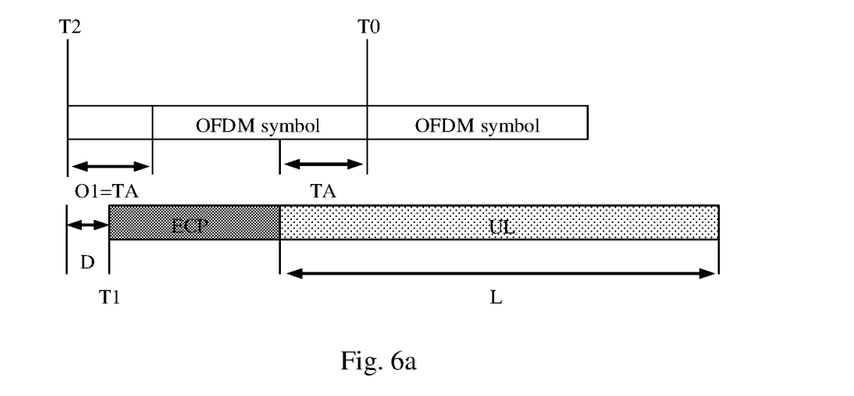
FIG. 6a, FIG. 6b, FIG. 6c and FIG. 6d are another schematic diagrams of determining the starting position T2 by the terminal according to the embodiment of the present application.
Figure 6B:
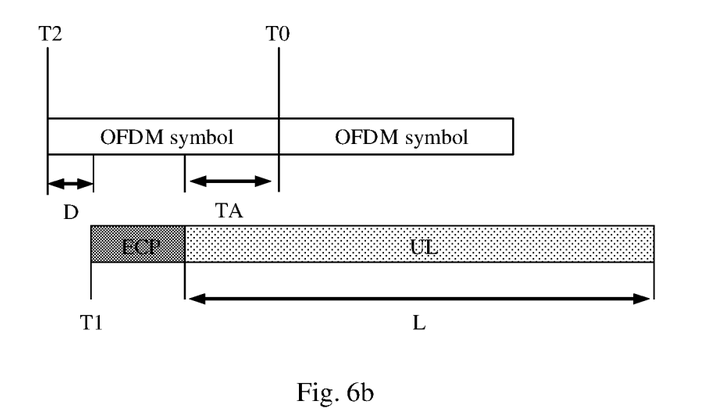
Figure 6C:
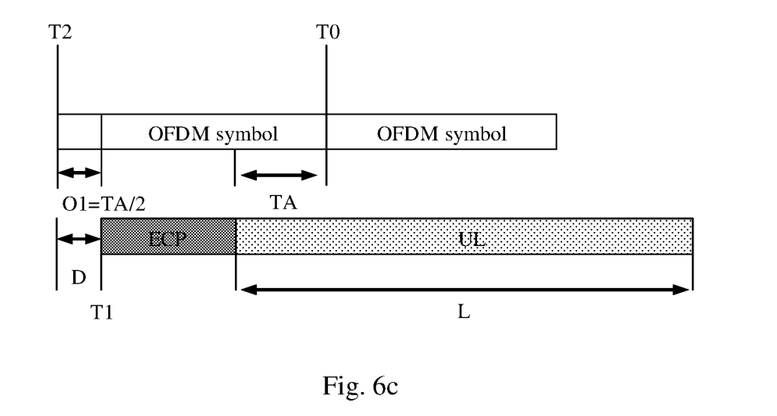
Figure 6D:
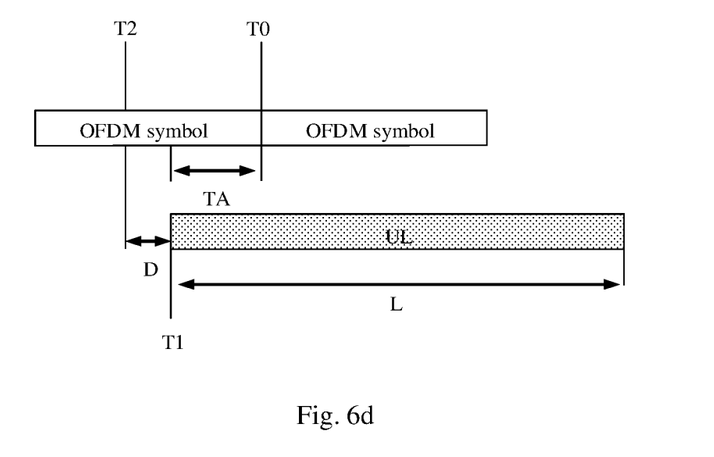

The terminal may determine the starting position of channel detection on the unlicensed spectrum according to formula (3). As shown in FIG. 6*a*, the time interval O1=time advance TA; as shown in FIG. 6*b*, the time interval O1 is equal to zero; as shown in FIG. 6*c*, the time interval O1=time advance TA/2; and as shown in FIG. 6d, the time interval O1=time advance TA+first duration D.

The process of how the terminal determines an end position of channel detection on the unlicensed spectrum when the channel access type is Cat1 or when the channel access type is Cat2 is described below.

In practical application, for Cat2, when the terminal performs channel detection and detects that the channel is idle, the terminal needs to determine the end position for channel detection, so as to start ECP transmission and/or uplink transmission at the determined end position.

Based on this, in an embodiment, the method further includes:
when it is determined that the channel access type is Cat2, the terminal performing a channel detection operation at the determined starting position for channel detection;
if the execution of the channel detection operation detects that the channel is idle, the terminal determining the end position of channel detection according to the starting position of channel detection and the first duration of channel detection on the unlicensed spectrum;
the terminal starting ECP transmission and/or uplink transmission at the determined end position.

Here, when the channel access type is Cat2, the terminal may determine the end position of channel detection on the unlicensed spectrum according to formula (4).

$$T1=T2+D \qquad (4),$$

where T1 represents the end position of the terminal performing channel detection on the unlicensed spectrum, T2 represents the starting position of the terminal performing channel detection on the unlicensed spectrum, and D represents the duration of the terminal performing channel detection on the unlicensed spectrum.

In practical application, for Cat1, the terminal does not need to perform channel detection operation, but only needs to determine the end position of channel detection, so as to start ECP transmission and/or uplink transmission at the determined end position.

Based on this, in an embodiment, the method further includes:
when it is determined that the channel access type is Cat1, the terminal determining the end position of channel detection according to the starting position of channel detection and the first duration of channel detection on the unlicensed spectrum; the terminal starting ECP transmission and/or uplink transmission at the determined end position.

Here, when the channel access type is Cat1, the terminal may determine the end position of channel detection on the unlicensed spectrum according to formula (4).

In practical application, for Cat1 or Cat2, the terminal may start ECP transmission at the end position of channel detection, and then perform uplink transmission; the terminal may also directly carry out uplink transmission at the end position of channel detection without ECP transmission. When the terminal performs ECP transmission, it is necessary to determine the starting position of ECP transmission.

The process of how the terminal determines the starting position of ECP transmission after channel detection on the unlicensed spectrum when the channel access type is Cat1 or when the channel access type is Cat2 is described below.

In an embodiment, the method further includes:
the terminal determining the starting position of ECP transmission according to the determined starting position for channel detection and the first duration for channel detection;
the terminal determining the starting position of uplink transmission after channel detection on the unlicensed spectrum according to the first information;
the terminal starting transmitting ECP at the determined starting position of ECP transmission until it ends transmitting ECP at the determined starting position of uplink transmission and starts uplink transmission.

Here, when the channel access type is Cat1 or when the channel access type is Cat2, the terminal may determine the starting position of transmitting ECP after channel detection on the unlicensed spectrum according to formula (5).

$$ET=T2+D \qquad (5)$$

ET represents the starting position of the terminal starting to transmit ECP after channel detection on the unlicensed spectrum, T2 represents the starting position of channel detection by the terminal on the unlicensed spectrum, and D represents the duration of channel detection by the terminal on the unlicensed spectrum.

In an embodiment, the method further includes:
the terminal determining the starting position of ECP transmission after channel detection on the unlicensed spectrum according to the first information; and determining the starting position of uplink transmission after channel detection on the unlicensed spectrum;
the terminal starting transmitting ECP at the starting position of ECP transmission, until it ends transmitting ECP at the starting position of uplink transmission, and starts uplink transmission.

The starting position of the ECP transmission may be explicitly indicated by the first information, in other words, the starting position of the ECP transmission may be carried in the first information.

In an embodiment, the first information is also used to indicate the starting time corresponding to the uplink time domain resource of the terminal scheduled by the base station and the length of the ECP transmitted by the terminal after channel detection on the unlicensed spectrum. The method further includes:
the terminal determining the starting position of uplink transmission after channel detection on the unlicensed spectrum according to the first information;
the terminal determining the starting position of ECP transmission according to the starting time and the length of ECP;
the terminal starting transmitting ECP at the determined starting position of ECP transmission until it ends transmitting ECP at the determined starting position of uplink transmission and starts uplink transmission.

Here, when the channel access type is Cat1 or when the channel access type is Cat2, the terminal may determine the starting position of transmitting ECP after channel detection on the unlicensed spectrum according to formula (6).

$$ET=T0-TA-E \qquad (6),$$

where ET represents the starting position of ECP transmission after the terminal performs channel detection on the unlicensed spectrum, T0 represents the starting time corresponding to the uplink time domain resource of the terminal scheduled by the base station, TA represents the time advance of uplink synchronization between the terminal and the base station, and E represents the length of the ECP transmitted by the terminal after channel detection on the unlicensed spectrum.

In an embodiment, for Cat1 or Cat2, the length of the ECP may be represented by at least one of the following parameters:

0;
m×Ls−D;
m×Ls−D−TA;
m×Ls−D−TA/2;
where m is a positive integer, Ls represents the length of OFDM symbols, D represents the duration of channel detection by the terminal on the unlicensed spectrum, and TA represents the time advance of uplink synchronization between the terminal and the base station.

The length of the ECP may be explicitly indicated by the first information, that is, the first information carries the length of the ECP. The length of the ECP may also be derived from the relationship expression according to other parameters indicated by the first information, as shown in formula (7).

$$E = T0-TA-T1 = T0-TA-T2-D = T0-S1+O1-TA-D = m \times Ls + O1 - TA - D \quad (7),$$

where E represents the length of the ECP transmitted by the terminal after channel detection on the unlicensed spectrum; T0 represents the starting time corresponding to the uplink time domain resource of the terminal scheduled by the base station, TA represents the time advance of the uplink synchronization between the terminal and the base station, T1 represents the end position of the terminal's channel detection on the unlicensed spectrum, and T2 represents the starting position of the terminal's channel detection on the unlicensed spectrum, D Indicates the duration of channel detection by the terminal on the unlicensed spectrum. m is an integer, Ls represents the length of the OFDM symbol, and O1 represents the offset between the boundary of the first OFDM symbol and the starting position of the terminal performing the channel detection operation. The first OFDM symbol may be n OFDM symbols before the starting time T0 corresponding to the uplink time domain resource, and N is an integer.

For example, as shown in FIG. 6a, it is assumed that the base station indicates ECP=m×Ls−D, and m=1, O1=TA, the terminal advances m=1 OFDM symbol forward according to T0 indicated by the base station, and determines the starting position T2=T0−m*Ls−O1 for channel detection (i.e., LBT operation) on the unlicensed spectrum according to formula (3). The terminal performs LBT operation from T2, and the length D of LBT is 16 us or 25 us. When the LBT operation is completed, the terminal determines the starting position T1=T2+D of ECP transmission, starts transmitting ECP from T1 to T0−TA, and then starts transmitting the scheduled data. Using the expression of T1 and T2, the expression of the ECP length may be obtained: ECP=m×Ls−D. The process of determining the ECP length in FIGS. 6b, 6c and 6d is similar to that in FIG. 6a and will not be described again.

The process of how the terminal determines the starting position of channel detection on the unlicensed spectrum and how to determine the starting position of uplink transmission after channel detection on the unlicensed spectrum when the channel access type is Cat4 is described below.

In practical application, the base station schedules the terminal for uplink transmission in the unlicensed spectrum. In order to realize uplink transmission, for Cat4, the terminal needs to determine the starting position of channel detection on the unlicensed spectrum and the starting position of uplink transmission after channel detection on the unlicensed spectrum according to the first information sent by the base station.

Based on this, in an embodiment, the first information is also used to indicate the starting time corresponding to the uplink time domain resource of the terminal scheduled by the base station, and the method further includes:

the terminal determining the channel access type for channel detection on the unlicensed spectrum according to the first information;
when it is determined that the channel access type is Cat4, the terminal determining a third duration for channel detection on the unlicensed spectrum according to a priority of a service;
the terminal determining the starting position of channel detection on the unlicensed spectrum according to the third duration and starting time; and
the terminal starting performing a channel detection operation at the determined starting position.

The channel access type may be explicitly indicated by the first information, that is, the first information may carry the channel access type. The channel access type may also be bound and indicated by other parameter in the first information, that is, the channel access type may be bound and indicated by the starting time indicated by the first information.

In an example, taking the channel access type as Cat4 as an example, the process of the terminal determining the starting position T2 for channel detection on the unlicensed spectrum is described.

Figure 7:
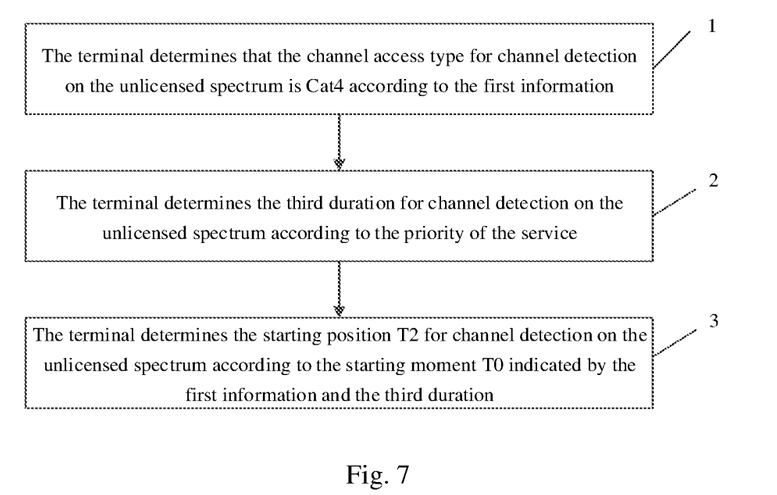
FIG. 7 is a schematic diagram of an implementation flow of determining the starting position T2 for Cat4 by the terminal according to the embodiment of the present application.

As shown in FIG. 7, the process of the terminal determining the starting position T2 includes the following steps.

In step 1, according to the first information, the terminal determines that the channel access type for channel detection on the unlicensed spectrum is Cat4.

In step 2, the terminal determines the third duration for channel detection on the unlicensed spectrum according to the priority of the service.

In step 3, the terminal determines the starting position T2 for channel detection on the unlicensed spectrum according to the starting time T0 indicated by the first information and the third duration.

Figure 8:
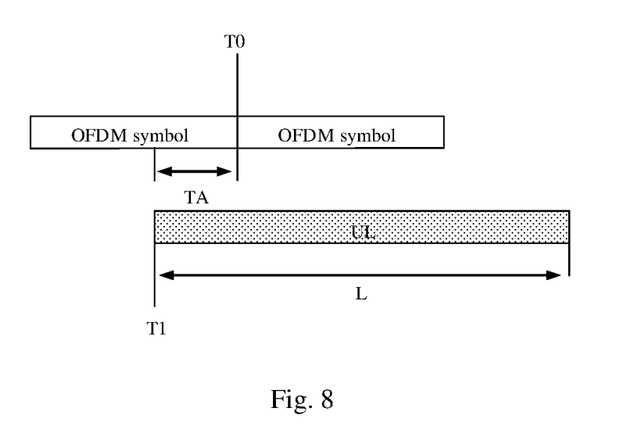
FIG. 8 is a schematic diagram of determining the starting position T2 for Cat4 by the terminal according to the embodiment of the present application.

Here, as shown in FIG. 8, for Cat4, the length of ECP is equal to zero.

In an embodiment, the method further includes:
when performing a channel detection operation and detecting that the channel is idle, the terminal determining an end position of channel detection according to the starting position of channel detection and the third duration; and the terminal starting uplink transmission at the determined end position.

Here, for Cat4, the terminal directly carries out uplink transmission at the end of channel detection, and there is no need to carry out ECP transmission, so there is no need to determine the starting position of ECP transmission.

In an embodiment, the uplink transmission includes at least one of the following transmissions:
Physical Uplink Shared Channel (PUSCH);
Physical Uplink Control Channel (PUCCH);
Physical Random Access Channel (PRACH);
Sounding Reference Signal (SRS).

How the first information indicates the channel access type, the starting position of ECP, etc. is described below.

In an example, the channel access type of the terminal performing channel detection on the unlicensed spectrum may be explicitly indicated by the first information, that is, the first information may carry the channel access type. The channel access type may also be bound and indicated by other parameter in the first information. When the first information carries the channel access type, the first duration D for channel detection and the ECP length, then the channel access type, the first duration D for channel detection and the ECP length may be indicated separately.

For example, two bits are used to indicate the channel access type (i.e. LBT type) and the first duration D for channel detection:
　　status 1: LBT Cat1, D=16 us;
　　status 2: LBT Cat2, D=16 us;
　　status 3: LBT Cat2, D=25 us;
　　status 4: LBT Cat4, D is not fixed;
　　then M1 bits is used to indicate ECP length E:
　　status x1: E=x1;
where M1 is a positive integer, the value of M1 depends on the number of x1, which is determined by the number of parameters representing the length E of ECP. The length E of the ECP may be represented by at least one of the following parameters:
　　0;
　　m×Ls−D;
　　m×Ls−D−TA;
　　m×Ls−D−TA/2.

In an example, the channel access type of the terminal performing channel detection on the unlicensed spectrum may be explicitly indicated by the first information, that is, the first information may carry the channel access type. The channel access type may also be bound and indicated by other parameter in the first information. When the first information carries the channel access type, the first duration D for channel detection and the starting position T1 of ECP, then the channel access type, the first duration D for channel detection and the starting position T1 of ECP may be indicated separately.

For example, two bits are used to indicate the channel access type (i.e. LBT type) and the first duration D for channel detection:
　　status 1: LBT Cat1, D=16 us;
　　status 2: LBT Cat2, D=16 us;
　　status 3: LBT Cat2, D=25 us;
　　status 4: LBT Cat4, D is not fixed;
　　then M2 bit is used to indicate the starting position T1 of ECP:
　　status x2: the starting position of ECP x2;
　　where M2 is a positive integer, and the value of M2 depends on the number of states X2, which is determined by the number of parameters representing the starting position T1 of ECP. The starting position T1 of the ECP may be represented by at least one of the following parameters:
　　T0−m×Ls+D;
　　T0−m×Ls−TA+D;
　　T0−m×Ls−TA/2+D;
　　T0−TA.

In an example, the channel access type of the terminal performing channel detection on the unlicensed spectrum may be explicitly indicated by the first information, that is, the first information may carry the channel access type. The channel access type may also be bound and indicated by other parameter in the first information. When the first information carries the channel access type, the first duration D for channel detection and the starting position T2 for channel detection (i.e. LBT operation), the channel access type, the first duration D for channel detection and the starting position T2 of LBT may be indicated separately.

For example, 2 bits are used to indicate the channel access type and the first duration D for channel detection, and 2 bits are used to indicate the starting position T2 of LBT.

For example, 2 bits are used to indicate the channel access type (i.e. LBT type) and the first duration D for channel detection:
　　status 1: LBT Cat1, D=16 us;
　　status 2: LBT Cat2, D=16 us;
　　status 3: LBT Cat2, D=25 us;
　　status 4: LBT Cat4, D is not fixed;
　　then M3 bit is used to indicate the starting position T2 of LBT:
　　status x3: the starting position of LBT x3;
　　where M3 is a positive integer, and the value of M3 depends on the number of status x3, which is determined by the number of parameters representing the starting position T2 of LBT. The starting position of LBT may be represented by at least one of the following parameters:
　　T0−m×Ls;
　　T0−m×Ls−TA;
　　T0−m×Ls−TA/2;
　　T0−TA−D.

In an example, the channel access type of the terminal performing channel detection on the unlicensed spectrum may be explicitly indicated by the first information, that is, the first information may carry the channel access type. The channel access type may also be bound and indicated by other parameter in the first information. When the first information carries the channel access type, the first duration D for channel detection and the ECP length, the channel access type, the first duration D for channel detection and the ECP length may be jointly indicated.

For example, M4+2 bits are used to indicate the channel access type, the first time D for channel detection, and the ECP length E:
　　status 1: LBT Cat1, D=16 us, E=x4;
　　. . .
　　status $2^{M4}+1$: LBT Cat2, D=16 us, E=x4;
　　. . .
　　status $2^{M4+1}$: LBT Cat2, D=25 us, E=x4;
　　. . .
　　status $2^{M4+2}$: LBT Cat4, D=unfixed, E=x4.

M4 is a positive integer, the value of M4 depends on the number of x4, which is determined by the number of parameters representing the length E of ECP. The length E of the ECP may be represented by at least one of the following parameters:
　　0;
　　m×Ls−D;
　　m×Ls−D−TA;
　　m×Ls−D−TA/2.

In an example, the channel access type of the terminal performing channel detection on the unlicensed spectrum may be explicitly indicated by the first information, that is, the first information may carry the channel access type. The channel access type may also be bound and indicated by other parameter in the first information. When the first information carries the channel access type, the first duration D for channel detection and the ECP length, the channel access type, the first duration D for channel detection and the starting position T1 of the ECP may be jointly indicated.

For example, M5+2 bits are used to indicate the channel access type, the first duration D for channel detection, and the starting position T1 of the ECP:

status 1: LBT Cat1, D=16 us, ECP starting position x5;
. . .
status $2^{M5}+1$: LBT Cat2, D=16 us, ECP starting position x5;
. . .
status $2^{M5+1}$: LBT Cat2, D=25 us, ECP starting position x5;
. . .
status $2^{M5+2}$: LBT Cat4, D=not fixed, ECP starting position x5.

M5 is a positive integer, the value of M5 depends on the number of x5, and the number of x5 is determined by the number of parameters representing the starting position T1 of ECP. The starting position T1 of the ECP may be represented by at least one of the following parameters:

T0−m×Ls+D;
T0−m×Ls−TA+D;
T0−m×Ls−TA/2+D;
T0−TA.

In an example, the channel access type of the terminal performing channel detection on the unlicensed spectrum may be explicitly indicated by the first information, that is, the first information may carry the channel access type. The channel access type may also be bound and indicated by other parameter in the first information. When the first information carries the channel access type, the first duration D for channel detection and the starting position T2 of LBT, the channel access type, the first duration D for channel detection and the starting position T2 of LBT may be jointly indicated.

For example, M6+2 bits are used to indicate the channel access type, the first duration D for channel detection, and the starting position T2 of LBT:

status 1: LBT Cat1, D=16 us, LBT starting position x6;
. . .
status $2^{M6}+1$: LBT Cat2, D=16 us, LBT starting position x6;
status $2^{M6+1}$: LBT Cat2, D=25 us, LBT starting position x6;
. . .
status $2^{M6+2}$: LBT Cat4, D=not fixed, LBT starting position x6.

M6 is a positive integer, and the value of M6 depends on the number of states x6, which is determined by the number of parameters representing the starting position T2 of LBT. The starting position T2 of LBT is represented by at least one of the following parameters:

T0−m×Ls;
T0−m×Ls−TA;
T0−m×Ls−TA/2;
T0−TA−D.

Adopting the technical solutions provided by the embodiments of the present application, the terminal receives the first information sent by the base station; the first information is used for the terminal to determine the channel access type for channel detection on the unlicensed spectrum and the starting position of at least one of ECP transmission or uplink transmission after channel detection on the unlicensed spectrum. In this way, the terminal can determine the channel access type for channel detection on the unlicensed spectrum and the starting position of at least one of ECP transmission or uplink transmission after channel detection on the unlicensed spectrum based on the first information, so that the terminal can realize channel detection on the unlicensed spectrum and start ECP transmission and/or uplink transmission after channel detection according to the determined channel access type.

Figure 9:
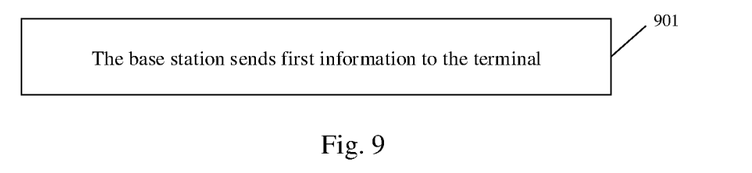
FIG. 9 is a schematic diagram of an implementation flow of an information transmission method on a base station side according to the embodiment of the present application.

The embodiment of the present application provides an information transmission method applied to a base station. FIG. 9 is a flow diagram of the information transmission method according to the embodiment of the present application. As shown in FIG. 9, the method includes the following steps.

In step 901, the base station sends first information to a terminal; the first information is used for the terminal to determine a channel access type for channel detection on an unlicensed spectrum, and a starting position of at least one of ECP transmission or uplink transmission after channel detection on the unlicensed spectrum.

In an embodiment, the first information is also used to indicate a starting time corresponding to an uplink time domain resource of the terminal scheduled by the base station, a first duration for the terminal to perform channel detection on the unlicensed spectrum, and a length of ECP that the terminal starts transmission after performing channel detection on the unlicensed spectrum; where the starting time, the first duration and the length of ECP are used for the terminal to determine the starting position of channel detection on the unlicensed spectrum. The specific implementation process may refer to the description of the base station side, which will not be repeated here.

In an embodiment, the first information is also used to indicate the first duration of channel detection by the terminal on the unlicensed spectrum; where the first duration is used for the terminal to determine the starting position of channel detection on the unlicensed spectrum. The specific implementation process may refer to the description of the base station side, which will not be repeated here.

In an embodiment, the first information is also used to indicate the starting position of the terminal for channel detection on the unlicensed spectrum.

In an embodiment, the first information is also used to indicate the starting time corresponding to the uplink time domain resource of the terminal scheduled by the base station and a second duration; the second duration represents a time interval between the starting time and a start time when the terminal performs a channel detection operation; where the starting time and the second duration are used for the terminal to determine the starting position of channel detection on the unlicensed spectrum. The specific implementation process may refer to the description of the base station side, which will not be repeated here.

In an embodiment, the second duration is expressed by the following expression:

T=m×Ls+O1; T represents the second duration, m is an integer, Ls represents the length of the OFDM symbol, and O1 represents an offset between a boundary of the first OFDM symbol and the starting position of the terminal performing the channel detection operation. The first OFDM symbol may be N OFDM symbols before the starting time T0 corresponding to the uplink time domain resource, and N is an integer.

In an embodiment, the first information is also used to indicate the length of the ECP that the terminal starts transmission after channel detection on the unlicensed spectrum, and the length of the ECP is used for the terminal to determine the starting position of ECP transmission. The specific implementation process may refer to the description of the base station side, which will not be repeated here.

In an embodiment, the base station sends the first information to the terminal in one of the following ways.

The base station sends the first information to the terminal through a radio resource control (RRC) message; alternatively, the base station sends the first information to the terminal through downlink control information (DCI). In particular, the RRC message may be cell-specific or UE-specific.

Figure 10:
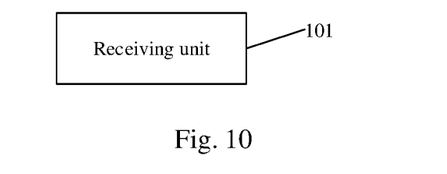
FIG. 10 is a structural diagram of a terminal according to an embodiment of the present application.

In order to realize the information transmission method according to the embodiment of the present application, the embodiment of the present application also provides a terminal. FIG. 10 is a schematic diagram of the composition and structure of the terminal according to the embodiment of the present application. As shown in FIG. 10, the terminal includes:

a receiving unit 101, configured to receive first information sent by a base station. The first information is used for the terminal to determine a channel access type for channel detection on an unlicensed spectrum, and a starting position of at least one of ECP transmission or uplink transmission after channel detection on the unlicensed spectrum.

In an embodiment, the first information is also used to indicate a starting time corresponding to an uplink time domain resource of the terminal scheduled by the base station, a first duration for the terminal to perform channel detection on the unlicensed spectrum, and a length of ECP transmitted by the terminal after channel detection on the unlicensed spectrum. The terminal also includes: a first determination unit, configured to determine a channel access type for channel detection on the unlicensed spectrum according to the first information; when it is determined that the channel access type is Cat1 or when it is determined that the channel access type is Cat2, determine the starting position of channel detection on the unlicensed spectrum according to the starting time, the first duration and the length of ECP indicated by the first information.

In an embodiment, the first information is also used to indicate the first duration for the terminal to perform channel detection on the unlicensed spectrum, and the terminal further includes: a second determination unit, configured to determine the channel access type for channel detection on the unlicensed spectrum according to the first information; and determine the starting position of ECP transmission after channel detection on the unlicensed spectrum; when it is determined that the channel access type is Cat1 or when it is determined that the channel access type is Cat2, determine the starting position for channel detection on the unlicensed spectrum according to the determined starting position for starting ECP transmission and the first duration.

In an embodiment, the first information is also used to indicate the starting position of the terminal for channel detection on the unlicensed spectrum; the terminal further includes: a third determination unit, configured for the terminal to determine the channel access type for channel detection on the unlicensed spectrum according to the first information; when it is determined that the channel access type is Cat1 or when it is determined that the channel access type is Cat2, determine the starting position for channel detection on the unlicensed spectrum according to the first information.

In an embodiment, the first information is also used to indicate the starting time corresponding to the uplink time domain resource of the terminal scheduled by the base station and the second duration; the second duration represents the time interval between the starting time and a start time when the terminal performs the channel detection operation. The terminal also includes: a fourth determination unit, configured to determine the channel access type for channel detection on the unlicensed spectrum according to the first information; when determining that the channel access type is Cat1 or when determining that the channel access type is Cat2, determine by the terminal the starting position of channel detection on the unlicensed spectrum according to the starting time indicated by the first information and the second duration.

In an embodiment, the second duration is expressed by the following expression: $T = m \times Ls + O1$; where T represents the second duration, m is an integer, Ls represents a length of an orthogonal frequency division multiplexing (OFDM) symbol, and O1 represents the offset between the boundary of the first OFDM symbol and the starting position where the terminal performs the channel detection operation.

In an embodiment, the value of m is determined by one of the following ways: the terminal determines the value of m according to the first information; the first information includes the value of m; the terminal compares TA with a preset threshold to obtain a comparison result; and determines the value of m according to the comparison result; the preset threshold is determined by the terminal according to the subcarrier spacing (SCS) and the first duration D.

In an embodiment, the terminal further includes: a fifth determination unit, configured to, when it is determined that the channel access type is Cat2, perform a channel detection operation at the determined starting position for channel detection; if it is detected that the channel is idle by performing the channel detection operation, determine an end position of channel detection according to the starting position of channel detection and the first duration of channel detection by the terminal on the unlicensed spectrum; and start ECP transmission and/or uplink transmission at the determined end position.

In an embodiment, the terminal further includes: a sixth determination unit, configured to, when the channel access type is determined to be Cat1, determine the end position of channel detection according to the starting position of channel detection and the first duration of channel detection on the unlicensed spectrum; and start ECP transmission and/or uplink transmission at the determined end position.

In an embodiment, the terminal further includes: a first transmission unit, configured to determine the starting position of ECP transmission according to the determined starting position for channel detection and the first duration for channel detection; determine a starting position for starting uplink transmission after channel detection on the unlicensed spectrum according to the first information; and start transmitting ECP at the determined starting position of ECP transmission until the transmission of ECP ends at the determined starting position of uplink transmission and the uplink transmission starts.

In an embodiment, the terminal further includes: a second transmission unit, configured to determine the starting position of ECP transmission after channel detection on the unlicensed spectrum according to the first information; and determine the starting position of uplink transmission after channel detection on the unlicensed spectrum; the terminal starts transmitting ECP at the determined starting position of ECP transmission until it ends transmitting ECP at the determined starting position of uplink transmission and starts uplink transmission.

In an embodiment, the first information is also used to indicate the starting time corresponding to the uplink time domain resource of the terminal scheduled by the base station and the length of the ECP transmitted by the terminal after channel detection on the unlicensed spectrum. The terminal further includes:

a third transmission unit, configured to determine the starting position of uplink transmission after channel detection on the unlicensed spectrum according to the first information; determine the starting position of ECP transmission according to the starting time and the length of ECP; start transmitting ECP at the determined starting position of ECP transmission until the transmission of ECP ends at the determined starting position of uplink transmission and the uplink transmission starts.

In an embodiment, the length of the ECP is represented by at least one of the following parameters:

0; m×Ls−D; m×Ls−D−TA; m×Ls−D−TA/2;

where m is a positive integer, Ls represents the length of OFDM symbols, D represents the duration of channel detection by the terminal on the unlicensed spectrum, and TA represents the time advance of uplink synchronization between the terminal and the base station.

In an embodiment, the first information is also used to indicate the starting time corresponding to the uplink time domain resource of the terminal scheduled by the base station, and the terminal also includes: a seventh determination unit, configured to determine the channel access type for channel detection on the unlicensed spectrum according to the first information; when it is determined that the channel access type is Cat4, determine a third duration for channel detection on the unlicensed spectrum according to a priority of a service; determine the starting position of channel detection on the unlicensed spectrum according to the third duration and the starting time; and start the channel detection operation at the determined starting position.

In an embodiment, the terminal further includes: a seventh determination unit, configured to, when it is detected that the channel is idle by performing a channel detection operation, determine the end position of channel detection according to the starting position of channel detection and the second duration; and start the uplink transmission at the determined end position.

In an embodiment, the uplink transmission includes at least one of the following transmissions: PUSCH; PUCCH; PRACH; SRS.

In practical application, the receiving unit 101 may be realized through a communication interface; the first determination unit, the second determination unit, the third determination unit, the fourth determination unit, the fifth determination unit, the sixth determination unit, the seventh determination unit, the first transmission unit and the second transmission unit may be realized by a processor in the terminal.

Figure 11:
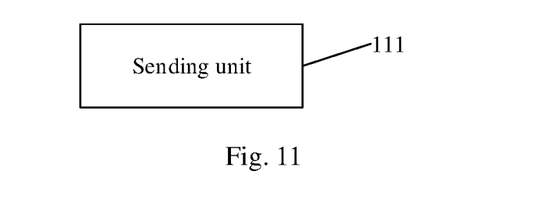
FIG. 11 is a structural diagram of a base station according to an embodiment of the present application.

In order to realize the information transmission method of the embodiments of the present application, the embodiment of the present application also provides a base station. FIG. 11 is a structural diagram of a base station according to an embodiment of the present application. As shown in FIG. 11, the base station includes:

a sending unit 111, configured to send first information to a terminal; the first information is used for the terminal to determine a channel access type for channel detection on an unlicensed spectrum, and a starting position of at least one of ECP transmission or uplink transmission after channel detection on the unlicensed spectrum.

In an embodiment, the first information is also used to indicate a starting time corresponding to an uplink time domain resource of the terminal scheduled by the base station, the first duration for the terminal to perform channel detection on the unlicensed spectrum, and a length of ECP that the terminal starts transmission after performing channel detection on the unlicensed spectrum; where the starting time, the first duration and the length of ECP are used for the terminal to determine the starting position of channel detection on the unlicensed spectrum.

In an embodiment, the first information is also used to indicate the first duration of channel detection by the terminal on the unlicensed spectrum; where the first duration is used for the terminal to determine the starting position of channel detection on the unlicensed spectrum.

In an embodiment, the first information is also used to indicate the starting position of the terminal for channel detection on the unlicensed spectrum.

In an embodiment, the first information is also used to indicate the starting time corresponding to the uplink time domain resource of the terminal scheduled by the base station and the second duration; the second duration represents a time interval between the starting time and a start time when the terminal performs a channel detection operation; where the starting time and the second duration are used for the terminal to determine the starting position of channel detection on the unlicensed spectrum.

In an embodiment, the second duration is expressed by the following expression:

$T = m \times Ls + O1;$ where T represents the second duration, m is an integer, Ls represents the length of the OFDM symbol, and O1 represents an offset between the boundary of the first OFDM symbol and the starting position of the terminal performing the channel detection operation.

In an embodiment, the first information is also used to indicate the length of the ECP that the terminal starts transmission after channel detection on the unlicensed spectrum, and the length of the ECP is used for the terminal to determine the starting position of starting ECP transmission.

In an embodiment, the sending unit is configured to send the first information to the terminal through an RRC message; alternatively, the first information is sent to the terminal through DCI.

In practical application, the sending unit 111 may be realized through a communication interface.

Figure 12:
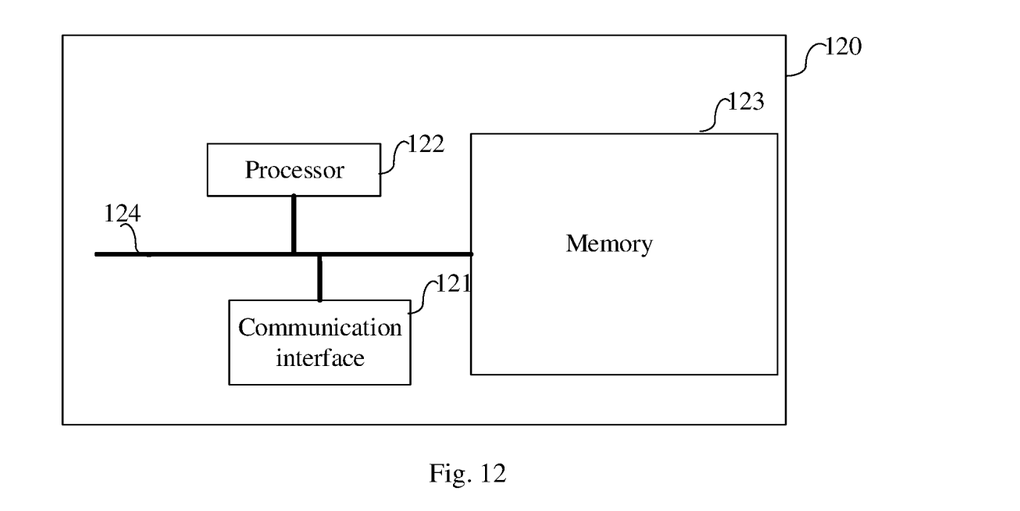
FIG. 12 is another structural diagram of a terminal or base station according to an embodiment of the present application.

Based on the hardware implementation of the above device, the embodiment of the present application also provides a data processing apparatus arranged on a terminal or base station. FIG. 12 is a schematic diagram of a hardware composition structure of the data processing apparatus according to the embodiment of the present application. As shown in FIG. 12, the data processing apparatus 120 includes a memory 123, a processor 122 and a computer program stored on the memory 123 and operable on the processor 122; the processor 122 located in the data processing apparatus implements the method provided by one or more technical solutions on the data processing apparatus side when executing the program.

Specifically, when the processor 122 located in the data processing apparatus 120 executes the program, it realizes: acquiring audio data; the audio data being collected by a first terminal; translating the audio data to obtain a first text; extracting at least two feature data of the first text and finding additional information associated with each feature data of the at least two feature data from a knowledge atlas database; generating a simultaneous interpreting result using the found additional information and the first text; outputting the simultaneous interpreting result; where the simultaneous interpreting result is synchronized output with the acquisition of audio data.

It should be noted that the specific steps implemented when the processor 122 located in the data processing apparatus 120 executes the program have been described in detail above and will not be repeated here.

It can be understood that the data processing apparatus also includes a communication interface 121; the various components in the data processing apparatus are coupled together through a bus system 124. It is understood that the bus system 124 is configured to enable connection communication between these components. In addition to the data bus, the bus system 124 also includes a power bus, a control bus, a status signal bus, etc.

It may be understood that the memory 123 in the present embodiment may be a volatile memory or a nonvolatile memory, or may include both volatile and nonvolatile memories. The nonvolatile memory may be a Read Only Memory (ROM), a Programmable Read-Only Memory (PROM), an Erasable Programmable Read-Only Memory (EPROM), an Electrically Erasable Programmable Read-Only Memory (EEPROM), a ferromagnetic random access memory (FRAM), a flash memory, a magnetic surface memory, an optical disc, or a Compact Disc Read-Only Memory (CD-ROM). The magnetic surface memory may be a magnetic disk memory or a magnetic tape memory. The volatile memory may be a Random Access Memory (RAM), which is used as an external cache. By way of example but not limitation, many forms of RAM are available, such as a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRS-DRAM), an Enhanced Synchronous Dynamic Random Access Memory (ESDRAM), a SyncLink Dynamic Random Access Memory (SLDRAM) and a Direct Rambus Random Access Memory (DRRAM). The memory described in the embodiments of the present application is intended to include, but is not limited to, these and any other suitable types of memory.

The method disclosed in the above embodiments of the present application may be applied to the processor 122 or implemented by the processor 122. The processor 122 may be an integrated circuit chip with signal processing capability. In the implementation process, each step of the above method may be completed by an integrated logic circuit of hardware or an instruction in the form of software in the processor 122. The above processor 122 may be a general-purpose processor, a DSP, or other programmable logic device, a discrete gate or a transistor logic device, a discrete hardware component, etc. The processor 122 may implement or execute the methods, steps, and logical block diagrams disclosed in the embodiments of the present application. The general-purpose processor may be a microprocessor or any conventional processor. The steps of the method disclosed in combination with the embodiments of the present application may be directly reflected in the execution of the hardware decoding processor, or the combination of hardware and software modules in the decoding processor. The software module may be located in a storage medium located in the memory, and the processor 122 reads information in the memory and completes the steps of the above method in combination with its hardware.

The embodiment of the present application also provides a storage medium, specifically a computer storage medium, more specifically a computer-readable storage medium, on which a computer instruction, i.e., a computer program, is stored. When the computer instruction is executed by the processor, the method provided by one or more technical solutions on the data processing apparatus side is performed.

In several embodiments provided in the present application, it should be understood that the disclosed method and smart device may be realized in other ways. The device embodiments described above are only schematic.

For example, the division of the unit is only a logical function division, and there may be another division mode in actual implementation, for example, a plurality of units or components may be combined or integrated into another system, or some features may be ignored or not executed.

In addition, the coupling, direct coupling or communication connection between the components shown or discussed may be through some interfaces, and indirect coupling or communication connection of devices or units may be electrical, mechanical or other forms.

The units described above as separate components may or may not be physically separated, and the components displayed as units may or may not be physical units, that is, they may be located in one place or distributed over multiple network units; some or all of the units may be selected according to actual needs to achieve the purpose of the solution of the present embodiment.

In addition, each functional unit in each embodiment of the present application may be integrated into a second processing unit, each unit may be used as a unit separately, or two or more units may be integrated into one unit. The above integrated units may be realized in the form of hardware or hardware plus software functional units.

Those skilled in the art can understand that all or part of the steps of realizing the above method embodiment can be completed by hardware related to program instructions, the above program can be stored in a computer-readable storage medium, and the program executes the steps including the above method embodiment when executing. The aforementioned storage medium includes: a mobile storage device, a ROM, a RAM, a magnetic disc or an optical disc and other media that can store program code.

Alternatively, if the above integrated unit of the present application is implemented in the form of software function module and sold or used as an independent product, it can also be stored in a computer-readable storage medium. Based on this understanding, the essence of the technical solutions of the present disclosure, or the part contributing to the related art, may be embodied in the form of a software product. The computer software product is stored in a storage medium including a number of instructions such that a computer device (which may be a personal computer, a data processing apparatus, or a network device, etc.) performs all or a part of steps of the method described in each of the embodiments of the present disclosure. The foregoing storage medium includes: any medium that is capable of storing program codes such as a mobile storage device, a ROM, a RAM, a magnetic disc or an optical disc.

It should be noted that "first" and "second" are used to distinguish similar objects, and do not have to be used to describe a specific order or sequence.

In addition, the technical solutions recorded in the embodiments of the application may be combined arbitrarily if there is no conflict.

The above is only the specific embodiments of the present application, and the protection scope of the present application is not limited thereto. Any person skilled in the art can easily think of changes or replacements within the technical scope disclosed in the application, which shall be covered by the protection scope of the present application.

What is claimed is:

1. A method for information transmission, comprising:
receiving, by a terminal, first information sent by a base station; wherein the first information is used for the terminal to determine a channel access type for channel detection on an unlicensed spectrum, and a starting position of at least one of Extended Cyclic Prefix (ECP) transmission or uplink transmission after the channel detection on the unlicensed spectrum,
wherein the first information is further used for indicating a starting time corresponding to an uplink time domain resource of the terminal scheduled by the base station, a first duration for the terminal to perform the channel detection on the unlicensed spectrum, and a length of the ECP transmitted by the terminal after the channel detection on the unlicensed spectrum, and the method further comprises:
determining, by the terminal, the channel access type for channel detection on the unlicensed spectrum according to the first information; and
when it is determined that the channel access type is Cat1, or when it is determined that the channel access type is Cat2, determining, by the terminal, a starting position for channel detection on the unlicensed spectrum according to the starting time, the first duration and the length of ECP indicated by the first information.

2. The method according to claim 1, wherein the first information is further used for indicating a first duration for the terminal to perform the channel detection on the unlicensed spectrum, and the method further comprises:
determining the channel access type for channel detection on the unlicensed spectrum according to the first information, and determining the starting position of the ECP transmission after the channel detection on the unlicensed spectrum, by the terminal; and
when it is determined that the channel access type is Cat1 or when it is determined that the channel access type is Cat2, determining, by the terminal, a starting position for channel detection on the unlicensed spectrum according to the determined starting position of the ECP transmission and the first duration.

3. The method according to claim 1, wherein the first information is further used for indicating a starting position of the terminal for channel detection on the unlicensed spectrum; and the method further comprises:
determining, by the terminal, the channel access type for channel detection on the unlicensed spectrum according to the first information; and
when it is determined that the channel access type is Cat1 or when it is determined that the channel access type is Cat2, determining, by the terminal, the starting position for channel detection on the unlicensed spectrum according to the first information.

4. The method according to claim 1, wherein the first information is further used for indicating a starting time corresponding to an uplink time domain resource of the terminal scheduled by the base station and a second duration; the second duration represents a time interval between the starting time and a start time when the terminal performs a channel detection operation, and the method further comprises:
determining, by the terminal, the channel access type for channel detection on the unlicensed spectrum according to the first information; and
when it is determined that the channel access type is Cat1 or when it is determined that the channel access type is Cat2, determining, by the terminal, a starting position for channel detection on the unlicensed spectrum according to the starting time and the second duration indicated by the first information.

5. The method according to claim 4, wherein the second duration is expressed by the following expression:

$$T = m \times Ls + O1;$$

wherein T represents the second duration, m is an integer, Ls represents a length of an orthogonal frequency division multiplexing (OFDM) symbol, and O1 represents an offset between a boundary of a first OFDM symbol and a starting position where the terminal performs the channel detection operation.

6. The method according to claim 5, wherein a value of m is determined by one of following ways:
determining, by the terminal, the value of m according to the first information; wherein the first information comprises the value of m; and
comparing, by the terminal, Time Advance (TA) with a preset threshold to obtain a comparison result; determining the value of m according to the comparison result; wherein the preset threshold is determined by the terminal according to a subcarrier spacing (SCS) and D.

7. The method according to claim 1, wherein the method further comprises:
when it is determined that the channel access type is Cat2, performing, by the terminal, a channel detection operation at a starting position for channel detection determined by the terminal;
when it is detected by the channel detection operation that a channel is idle, determining, by the terminal, an end position of channel detection according to the starting position for channel detection and the first duration for the terminal to perform channel detection on the unlicensed spectrum; and
starting, by the terminal, the ECP transmission and/or the uplink transmission at the determined end position.

8. A method for information transmission, comprising:
sending, by a base station, first information to a terminal; wherein the first information is used for the terminal to determine a channel access type for channel detection on an unlicensed spectrum, and a starting position of at least one of ECP transmission or uplink transmission after the channel detection on the unlicensed spectrum,
the first information is further used for indicating a starting time corresponding to an uplink time domain resource of the terminal scheduled by the base station, a first duration for the terminal to perform the channel detection on the unlicensed spectrum, and a length of the ECP transmitted by the terminal after the channel detection on the unlicensed spectrum,
wherein the starting time, the first duration and the length of ECP are used for the terminal to determine a starting position for channel detection on the unlicensed spectrum when it is determined that the channel access type is Cat1 or when it is determined that the channel access type is Cat2.

9. A terminal, comprising:
a memory, a processor and a computer program stored on the memory and operable on the processor, wherein when executing the program, the processor implements:
receiving first information sent by a base station; wherein the first information is used for the terminal to determine a channel access type for channel detection on an unlicensed spectrum, and a starting position of at least one of Extended Cyclic Prefix (ECP) transmission or uplink transmission after the channel detection on the unlicensed spectrum, wherein the first information is further used for indicating a starting time corresponding to an uplink time domain resource of the terminal scheduled by the base station, a first duration for the terminal to perform the channel detection on the unlicensed spectrum, and a length of the ECP transmitted by the terminal after the channel detection on the unlicensed spectrum, and the processor is further configured to:

determine the channel access type for channel detection on the unlicensed spectrum according to the first information; and when it is determined that the channel access type is Cat1 or when it is determined that the channel access type is Cat2, determine a starting position for channel detection on the unlicensed spectrum according to the starting time, the first duration and the length of ECP indicated by the first information.

10. The terminal according to claim 9, wherein the processor is further configured to:

when it is determined that the channel access type is Cat2, perform a channel detection operation at a determined starting position for channel detection; when it is detected by the channel detection operation that a channel is idle, determine an end position of channel detection according to the starting position for channel detection and the first duration for the terminal to perform channel detection by on the unlicensed spectrum; and start the ECP transmission and/or the uplink transmission at the determined end position.

11. The terminal according to claim 9, wherein the processor is further configured to:

when it is determined that the channel access type is Cat1, determine an end position of channel detection according to a starting position for channel detection and a first duration for the terminal to perform channel detection on the unlicensed spectrum; and start the ECP transmission and/or the uplink transmission at the determined end position.

12. The terminal according to claim 9, wherein the processor is further configured to:

determine the starting position of the ECP transmission according to a determined starting position for channel detection and a first duration for channel detection;

determine the starting position of the uplink transmission after channel detection on the unlicensed spectrum according to the first information; and start transmitting ECP at the determined starting position of the ECP transmission until the transmission of ECP ends at the determined starting position of the uplink transmission and the uplink transmission starts.

13. The terminal according to claim 9, wherein the processor is further configured to:

determine the starting position of ECP transmission after the channel detection on the unlicensed spectrum according to the first information; and determine the starting position of uplink transmission after the channel detection on the unlicensed spectrum; and start transmitting ECP at the determined starting position of the ECP transmission by the terminal until it ends transmitting ECP at the determined starting position of uplink transmission and starts the uplink transmission.

14. The terminal according to claim 9, wherein the first information is further used for indicating a starting time corresponding to an uplink time domain resource of the terminal scheduled by the base station, and a length of the ECP transmitted by the terminal after the channel detection on the unlicensed spectrum, and the processor is further configured to:

determine the starting position of uplink transmission after the channel detection on the unlicensed spectrum according to the first information; determine the starting position of ECP transmission according to the starting time and the length of ECP; and start transmitting ECP at the determined starting position of ECP transmission until the transmission of ECP ends at the determined starting position of uplink transmission and the uplink transmission starts.

15. The terminal according to claim 9, wherein a length of the ECP is represented by at least one of following parameters:

0;

$m \times Ls - D$;

$m \times Ls - D - TA$; and $m \times Ls - D - TA/2$;

wherein m is a positive integer, Ls represents a length of an OFDM symbol, D represents a duration of channel detection by the terminal on the unlicensed spectrum, and TA represents a time advance of uplink synchronization between the terminal and the base station.

16. A base station, comprising:

a memory, a processor and a computer program stored on the memory and operable on the processor, wherein when executing the program, the processor implements:

sending first information to a terminal; wherein the first information is used for the terminal to determine a channel access type for channel detection on an unlicensed spectrum, and a starting position of at least one of ECP transmission or uplink transmission after the channel detection on the unlicensed spectrum, the first information is further used for indicating a starting time corresponding to an uplink time domain resource of the terminal scheduled by the base station, a first duration for the terminal to perform the channel detection on the unlicensed spectrum, and a length of the ECP transmitted by the terminal after the channel detection on the unlicensed spectrum; wherein the starting time, the first duration and the length of ECP are used for the terminal to determine a starting position for channel detection on the unlicensed spectrum when it is determined that the channel access type is Cat1 or when it is determined that the channel access type is Cat2.

* * * * *